No. 614,788. Patented Nov. 22, 1898.
J. BILLINGSLEY.
GATE.
(Application filed Feb. 20, 1897.)
(No Model.) 2 Sheets—Sheet 1.
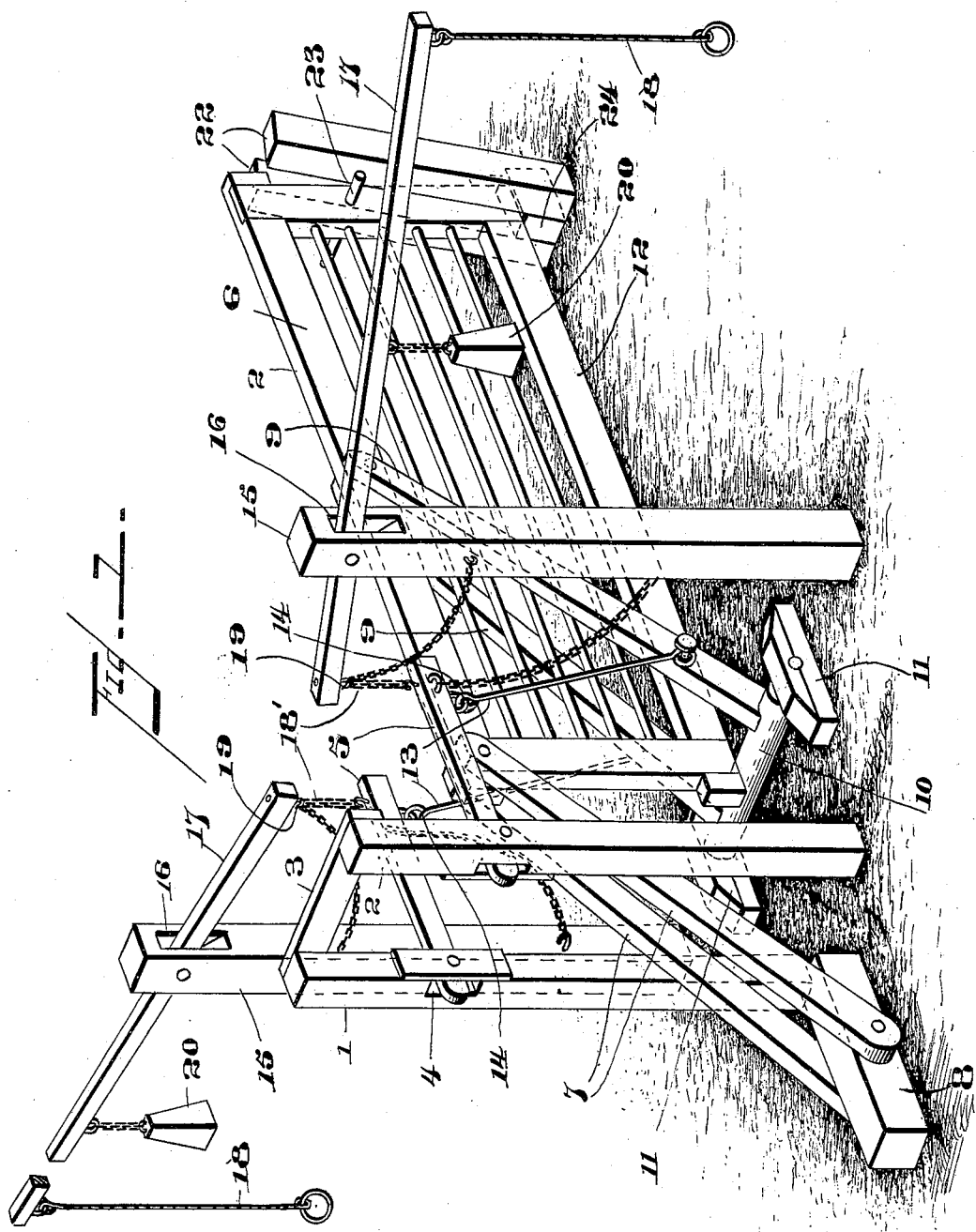
WITNESSES
Marcus L. Byng.
INVENTOR
John Billingsley
By John Hedderburn
Attorney No. 614,788. Patented Nov. 22, 1898.
J. BILLINGSLEY.
GATE.
(Application filed Feb. 20, 1897.)
(No Model.) 2 Sheets—Sheet 2.
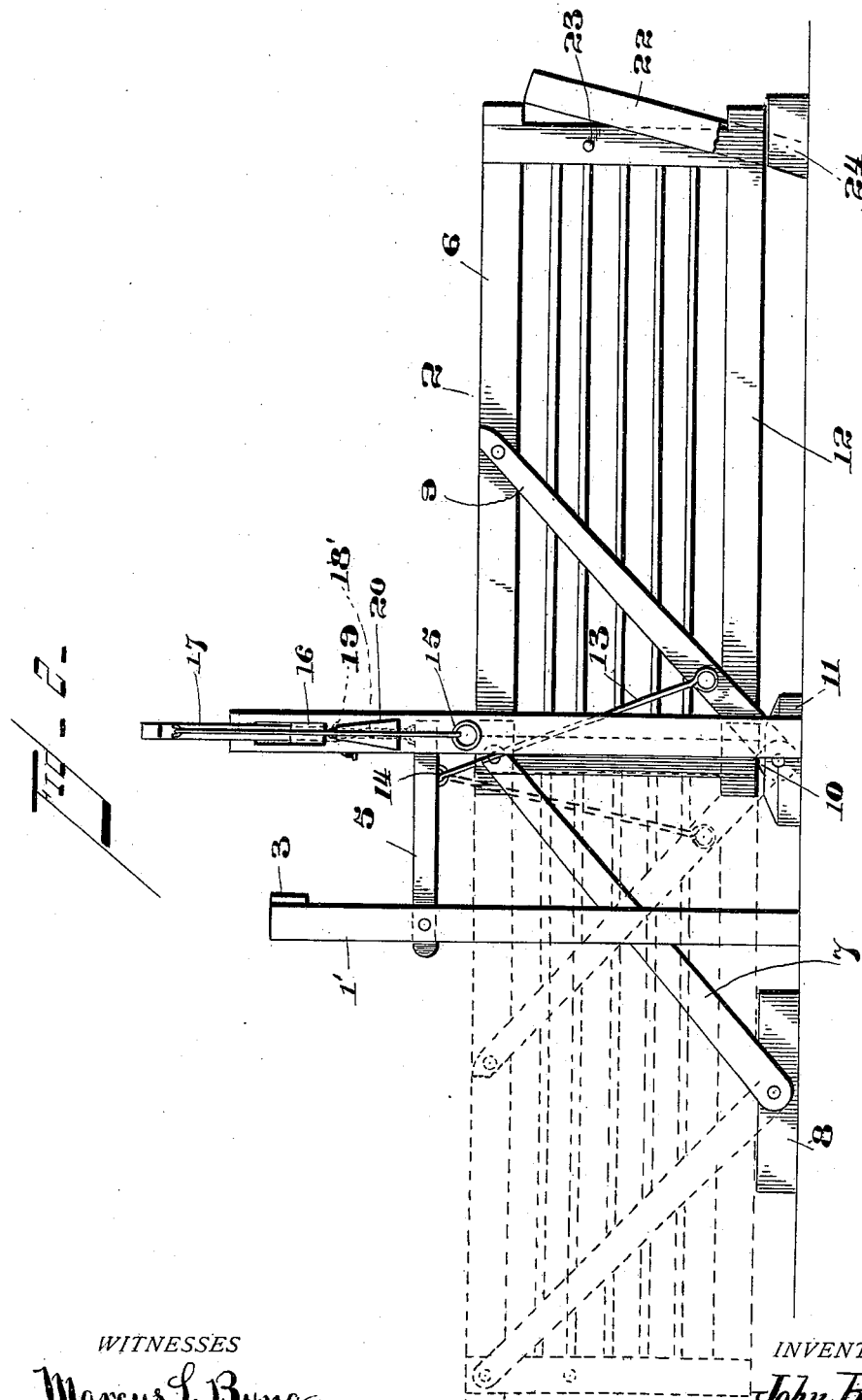
WITNESSES
Marcus L. Byng.
INVENTOR
John Billingsley
By John Shepherd
Attorney

UNITED STATES PATENT OFFICE.

JOHN BILLINGSLEY, OF ELIASVILLE, TEXAS.

GATE.

SPECIFICATION forming part of Letters Patent No. 614,788, dated November 22, 1898.

Application filed February 20, 1897. Serial No. 624,425. (No model.)

*To all whom it may concern:*

Be it known that I, JOHN BILLINGSLEY, a citizen of the United States, residing at Eliasville, in the county of Young and State of Texas, have invented certain new and useful Improvements in Gates; and I do hereby declare the following to be a full, clear, and exact description of the invention, such as will enable others skilled in the art to which it appertains to make and use the same.

My invention relates to improvements in gates, and has reference to that class of gates which may be opened by passengers on horseback or in carriages by a suitable arrangement of levers, whereby the inconvenience of dismounting and operating the gate by hand is obviated.

The invention consists in the novel features of construction hereinafter fully described and claimed, and illustrated in the accompanying drawings, in which—

Figure 1 is a perspective view of my gate. Fig. 2 is a side elevation of the same, dotted lines showing the gate in the opened position.

In the drawings, 1 1' represent uprights situated in the rear and on either side of the gate 2, the said uprights being connected at their upper ends by a cross-piece 3. The inner sides of these uprights are recessed at 4, and pivoted in these recesses are the horizontally-extending levers 5, which extend on either side of the gate.

Pivoted to the gate at its rear end and on either side of its top bar 6 are the downwardly and rearwardly extending bars or legs 7. These bars 7 are pivoted at their opposite ends to the block 8, which is secured in the ground.

Pivoted to the top bar 6, at the center of the gate, is a second pair of downwardly and rearwardly extending bars 9, which extend parallel with the bars 7 and at their lower ends are attached to the respective ends of the cross-bar 10. This cross-bar 10 is pivoted between the blocks 11, which are also fixed in the ground. The lower or bottom bar 12 of the gate rests at its rear end on this cross-bar 10 when the gate is closed, as illustrated in Fig. 1.

The links or levers 13 are attached to the under sides of the horizontal levers 5 by engagement with the eyes 14 in said levers and at their opposite ends are pivoted to the bars or legs 9 near their lower end, one link extending down on either side of the gate.

The posts 15 are provided on either side of the gate and in line with each other, said posts being slotted near their upper ends at 16. Pivoted in these slots are the operating-levers 17, having at their outer ends depending cords 18, which extend within convenient reach of a person approaching the gate from either direction. The inner ends of these levers 17 are connected with the horizontal levers 5 by means of the chains 18'. The connection of these chains to the operating-levers is by means of hooks 19 in said levers, which are adapted to engage the links of the chain. The opposite ends of the chains are attached to the posts 15, as shown.

Upon the operating-lever 17 are the weights 20, which can be adjusted thereon until they nearly equal the weight of the gate, so that its opening and closing may be effected with but a slight pull upon the operating-cord. At the front end of the gate are the posts 22, between which that end of the gate is adapted to pass. The lower bar of the gate at the front end rests upon the block 24 when the gate is closed, the block limiting the forward movement of the gate. A handle or pin 23 is provided upon the forward end of the gate, so that the same may be opened by hand far enough to permit the passage of a person therethrough, the gate closing itself when released.

The operation of my gate is as follows: When it is desired to open the gate by a person approaching from either direction, all that is necessary is to pull the operating-lever by means of its depending cord and lift its inner end, which, through its connection with the lever 5, pulls upon the outer end of that lever, elevating the same, and through the medium of the link 13 swinging backward the pairs of bars 7 and 9. This motion of the tilting bars 7 and 9 raises the gate and at the same time draws the same rearward until its center is reached, when the momentum of the gate will carry it over its center and its weight will cause it to drop to the position shown in dotted lines in Fig. 2. When the vehicle has passed, the gate can be closed from the opposite side in a similar manner, its operation being exactly the same.

In light gates the weights upon the operating-levers can be dispensed with, as it requires but slight effort to raise and operate the same.

The chains 18' limit the upward movement of the ends of the operating-levers, so that when they have raised the gate the required distance their upward movement is stopped and the gate permitted to carry itself over the center.

The advantage of having the horizontally-extending levers is that lateral strain is taken off of the operating-levers, as the latter would be twisted laterally during the movement of the gate and have a tendency to become jammed or broken. These horizontally-extending levers prevent any lateral strain upon the operating-levers and form an easy-working gate.

From the above description it will be understood that I have produced a gate possessing the advantages of never swagging, it being swung at the top and center of the gate-frame, of not being opened by the blowing of the wind, or obstructed in its movement by articles in the road, it being lifted up and out of the way of stones and other such obstacles.

Having thus fully described my invention, what I claim as new, and desire to secure by Letters Patent, is—

1. The combination of a gate, horizontally-extending levers suitably supported at one end of the gate, operating-levers, operative connections between said operating-levers and the horizontally-extending levers, downwardly and rearwardly extending bars pivoted at one end to the gate, and at their opposite ends to suitable blocks, and links connecting said bars with the horizontally-extending levers, substantially as set forth.

2. The combination of a gate, horizontally-extending levers suitably supported at one end of the gate, operating-levers, an operative connection between said horizontal levers and the operating-levers, downwardly and rearwardly extending pairs of parallel bars between which the gate is pivoted, one pair of said bars secured at their lower ends to a shaft which is pivoted between suitable blocks, the lower edge of the gate being adapted to rest upon said shaft in an open or closed position, the other pair of bars pivoted to a block which also forms a support for the gate when the latter is opened, links connecting the horizontal levers with the bars to which the gate is pivoted, and a support for the front edge of the gate when it is in a closed position, substantially as set forth.

3. The combination of a gate, pairs of bars pivoted at their upper ends to the gate, said bars being pivoted at their lower ends to suitable blocks, horizontally-extending levers suitably supported at one end of the gate, links connecting the said levers with said bars, operating-levers, and chains connected at one end to the operating-levers and engaging the horizontal levers, the opposite ends of said chains being attached to the supports to which the horizontal levers are pivoted, said chains being adjustably connected to the horizontally-extending levers, substantially as set forth.

4. The combination of a gate, uprights at the rear of said gate, horizontally-extending levers pivoted to said uprights, pairs of downwardly and rearwardly extending bars pivoted at their upper ends on opposite sides of the gate one pair of the bars being pivoted to a suitable block at the base of the gate, the other pair being attached to a shaft which is pivoted between suitable blocks, the lower rear edge of the gate adapted to rest upon said shaft and block when the gate is opened, links connecting the horizontal levers with said bars, operating-levers, operative connections between said operating-levers and horizontally-extending levers, a block upon which the gate is adapted to rest at its lower front edge when it is closed, posts between which the front edge of the gate is adapted to extend, and a stop carried by said gate to limit its movement between said posts, substantially as set forth.

In testimony whereof I have signed this specification in the presence of two subscribing witnesses.

JOHN BILLINGSLEY.

Witnesses:
T. F. DAMELL,
W. H. ARDIS.